United States Patent
Reiner

[11] Patent Number: 5,995,629
[45] Date of Patent: Nov. 30, 1999

[54] ENCODING DEVICE

[75] Inventor: Robert Reiner, Unterhaching, Germany

[73] Assignee: Siemens Aktiengesellschaft, Munich, Germany

[21] Appl. No.: 08/911,676

[22] Filed: Aug. 15, 1997

Related U.S. Application Data

[63] Continuation of application No. PCT/DE96/00094, Jan. 23, 1996.

[30] Foreign Application Priority Data

Feb. 15, 1995 [DE] Germany .......................... 195 05 097

[51] Int. Cl.⁶ ........................................... H04L 9/00
[52] U.S. Cl. ................................... 380/50; 380/9; 380/40; 380/41
[58] Field of Search .................................... 380/3, 4, 6, 9, 380/10, 11, 15, 20, 21, 22, 23, 24, 30, 31, 36, 37, 42, 46, 48, 49, 50, 39, 40, 41; 364/200, 222.5, 246.6, 260.81, 286.5, 364, 900, 918.7, 943.7, 947.4, 958.2, 966, 969.4, 969.3, 971.1; 365/49, 53, 120; 235/379; 375/108, 109, 110, 379; 713/224.4, 217.3

[56] References Cited

U.S. PATENT DOCUMENTS

| | | | |
|---|---|---|---|
| 3,515,805 | 6/1970 | Fracassi et al. | 178/22 |
| 3,522,374 | 7/1970 | Abrahamsen | 178/22 |
| 3,639,690 | 2/1972 | Braun et al. | 178/22 |
| 3,657,699 | 4/1972 | Rocher | 340/146.1 |
| 3,700,806 | 10/1972 | Vasseur | 178/22 |
| 4,115,657 | 9/1978 | Morgan | 178/22 |
| 4,760,598 | 7/1988 | Ferrel | 380/44 |
| 4,932,053 | 6/1990 | Fuhauf et al. | |
| 5,001,756 | 3/1991 | Mayginnes et al. | |
| 5,179,570 | 1/1993 | Imran | 375/1 |
| 5,351,292 | 9/1994 | Lindholm | |
| 5,825,882 | 10/1998 | Kowalski et al. | 380/25 |

FOREIGN PATENT DOCUMENTS

| | | | |
|---|---|---|---|
| 0 314 148 A2 | 5/1989 | European Pat. Off. | |
| 0018869 | 11/1980 | France | 380/50 |
| 3006717 | 8/1981 | Germany | 380/50 |

*Primary Examiner*—Tod R. Swann
*Assistant Examiner*—Paul E. Callahan
*Attorney, Agent, or Firm*—Herbert L. Lerner; Laurence A. Greenberg

[57] ABSTRACT

An encoding device includes an encoding unit and an output register downstream of the encoding unit. During a second time period, encoded output data are formed from input data fed to the encoding unit and are written into the output register. After the second time period elapses, no further data are fed to the output register, but power consumption of the output register must not alter. The encoding unit continues to generate output data until a first time period elapses. The encoding device prevents an external observer from drawing any conclusions from the power consumption of the encoding device as to the actual generating period of the encoded output data in the output register.

5 Claims, 1 Drawing Sheet

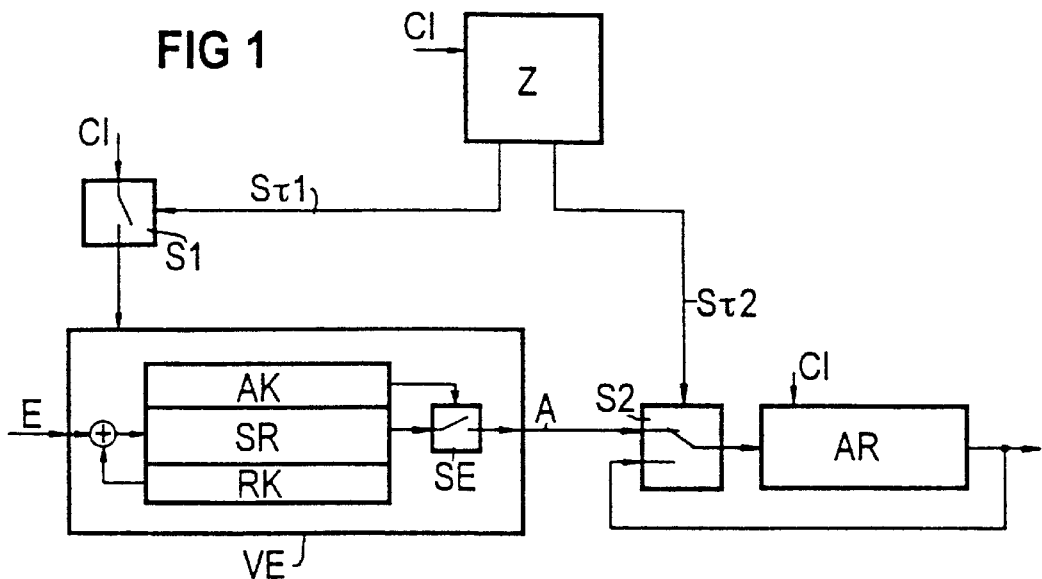
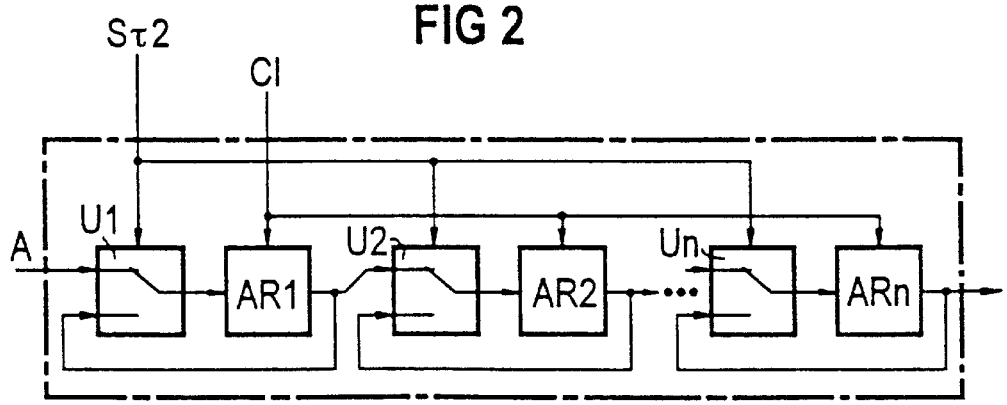

ENCODING DEVICE

CROSS-REFERENCE TO RELATED APPLICATION

This application is a continuation of International Application Serial No. PCT/DE96/00094, filed Jan. 23, 1996.

BACKGROUND OF THE INVENTION

FIELD OF THE INVENTION

The invention relates to an encoding device.

In data transmissions between two units of a system, for example between a mobile part, such as a chip card, and a stationary part, such as a reader, it is becoming increasingly important to encode the data to be transmitted, since knowledge of the transmitted data would give a defrauder the opportunity to manipulate an operation controlled by the data transmission. An encoding operation can take place in such a way that first of all a datum is sent from one of the units to the other unit and is encoded there through the use of an encoding device. The encoded datum is then sent back from the encoding unit to the sending unit. In the sending unit, the encoded datum is then either decoded, with it being possible in such a procedure to use both symmetrical algorithms and asymmetrical algorithms, or else it is encoded in the same way as in the mobile part and is compared with the encoded datum that is received.

Although the last-mentioned method cannot be used for the transmission of any desired information, since the ultimate receiver must already know the information, it can be used in a particularly advantageous way for authentication, since the mobile part, which encodes the received datum and sends it back to the stationary part, must thereby verify that it has the correct encoding algorithm, or the correct encoding device, and can thus identify itself. In the same way, of course, an authentication of the stationary part or reader can take place, since only if the two parts have the same encoding device, or the same encoding algorithm, does the datum encoded in the two parts produce a positive match when compared.

In the case of most encoding algorithms, in which the encoded datum is decoded again in the receiver, complicated computing units are necessary, are usually formed by a microprocessor and a special coprocessor, and require a considerable computing time. Pseudo-random generators are very much more simple, although only the second method mentioned above can be carried out therewith, since the encoding of an input datum of such a pseudo-random generator can no longer be reversed and consequently only the encoding operation can be carried out in the two parts of a system and the results of the two encoding operations compared with each other.

Usually a datum to be encoded and a secret code serve as input data for an encoding device. However, in order to increase security, further data may also be used, in particular time-variable data such as counter contents, for example of an error counter. All of those input data are processed into encoded output data through the use of an algorithm to be kept secret. In that case the algorithm may be realized by hardware, as in the example of a shift register, for example by a logical combination of a number of the states existing in the shift register.

Since in any event the data are in digital form, a clock signal which synchronizes the individual operations is necessary for their encoding. A defrauder could thus attempt to draw conclusions as to the type of encoding operation from the number of pulses of the clock signal occurring in an encoding operation.

SUMMARY OF THE INVENTION

It is accordingly an object of the invention to provide an encoding device, which overcomes the hereinafore-mentioned disadvantages of the heretofore-known devices of this general type and in which a time necessary for generation of an encoding result cannot be identified from a clock signal.

With the foregoing and other objects in view there is provided, in accordance with the invention, an encoding device, comprising a first switch; an encoding unit having at least one data input for input data, at least one data output for output data and a clock input for receiving a clock signal through the first switch; an output register having a data input, a data output and a clock input for receiving the clock signal; a second switch connected between the data output of the encoding unit and the data input of the output register; and a device for generating a first time period for driving the first switch and a second time period lying within the first time period for driving the second switch; the encoding unit clocked by the clock signal for generating the output data from the input data during the first time period; and the second switch transmitting the output data during the second time period from the encoding unit into the output register.

In accordance with another feature of the invention, the device for generating the first and second time periods includes an adjustable counter having a clock input for receiving the clock signal.

In accordance with a further feature of the invention, the output register is a shift register, the second switch is a change-over switch having first and second inputs and one output, and the data output of the output register is connected to the second input of the change-over switch.

In accordance with an added feature of the invention, the output register is a shift register subdivided into a plurality of shift register parts each having an input and an output; the second switch includes a plurality of change-over switches driven by the device for generating the first and second time periods, the change-over switches including a first change-over switch and other change-over switches; each of the change-over switches is associated with a respective one of the shift register parts, each of the change-over switches has an output connected to the input of the associated shift register part, a first input, and a second input connected to the output of the associated shift register part, the first input of the first change-over switch is connected to the data output of the encoding unit, and the first inputs of the other change-over switches are each connected to the output of the shift register part disposed upstream of the respective associated shift register part.

In accordance with an additional feature of the invention, the encoding unit includes a feedback shift register and a non-linear-extraction unit associated with the feedback shift register.

In accordance with a concomitant feature of the invention, the output register cannot be read out prematurely.

Other features which are considered as characteristic for the invention are set forth in the appended claims.

Although the invention is illustrated and described herein as embodied in an encoding device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block circuit diagram of a special encoding device according to the invention; and FIG. 2 is a block circuit diagram of structural variant of part of the encoding device according to the invention.

DESCRIPTION OF THE PREFERRED EMBODIMENTS

Referring now to the figures of the drawings in detail and first, particularly, to FIG. 1 thereof, there is seen an encoding device according to the invention, which contains an encoding unit VE as its core. Input data E are fed to the encoding unit VE. In the example shown, these input data E are fed serially and include, for example, an input datum to be encoded, a secret code, and further, preferably time-variable data, such as, for example, a current reading of an error counter. It would also be possible of course at any time to feed these data in parallel and to combine them logically in some manner or other. In the example shown, the encoding unit VE is formed by a shift register SR, to which a feedback unit RK is assigned. This feedback unit RK combines certain logical states within the shift register SR and feeds a result of this combination back to an input of the shift register SR, where it is combined with the input data E, for example added to the latter. The shift register SR is also assigned an extraction unit AK, which combines certain states of the shift register SR non-linearly and feeds a result of this combination, which may, for example, be a multiplication, to a switching element SE, that is driven by this signal originating from the extraction unit AK. Through the use of this switching element SE, the output data of the shift register SR are fed to an output of the encoding unit VE as output data A.

Thus, depending on the input data E and the hardware realization of the feedback unit RK, the shift register SR generates a continuous sequence of data bits, although only some are fed to the output of the encoding unit VE as output data A, depending on the extraction unit AK.

These output data A are fed to a first input of a switch S2 having an output which is connected to an input of an output register AR. An output of this output register AR on one hand forms an output of the encoding device and on the other hand is routed back to a second input of the switch S2. The output register in this case may be a serial register, such as, for example, a shift register, or else a parallel register, which is written into, for example, through the use of a multiplexer. In this output register AR the output data A are buffer-stored and can be read out only after the encoding operation has been completed. In order to ensure synchronicity of the encoding unit VE and of the output register AR, both elements of the encoding device according to the invention are fed a clock signal C1. However, the clock signal C1 is fed to the encoding unit VE through a switch S1. The two switches S1 and S2 are respectively driven by a signal which originates from a device Z for generating signals Sτ1, Sτ2 lasting for certain time periods. In this case, the switch S1 is driven by the signal Sτ1, which lasts for a time period τ1. The switch S2 is driven by the signal Sτ2, which lasts for a time period τ2, that lies within the time period τ1. The device Z may be advantageously constructed with a counter which in each case emits the signals Sτ1, Sτ2 after reaching certain adjustable time periods τ1, τ2, in order to actuate the switches S1, S2. The counter device Z is likewise fed the clock signal C1 for this purpose.

The encoding operation thus takes place as follows: when switching on, the switch S1 is closed and the switch S2 is in such a position that the output of the encoding unit VE is connected to the input of the output register AR. The encoding unit VE then begins synchronously with the clock signal C1 to generate the output data A, which are written into the output register AR through the switch S2. After the time period τ2 elapses, the signal Sτ2 changes its state, so that the switch S2 is switched over and the output of the output register AR is then connected through the change-over switch S2 to the input of the latter. The switch S1 continues to remain closed, since the time period τ1 is greater than the time period τ2. The encoding unit VE consequently continues to generate the output data A, although the output data are no longer written into the output register AR and consequently do not contribute anything to an encoded data word. Instead, the data in the output register AR are shifted in circulation. After the time period τ1 elapses, the state of the signal Sτ1 changes, so that the switch S1 is opened and the encoding unit VE no longer receives a clock signal and consequently can no longer generate any output data A.

An observer of this encoding operation can only measure from the outside the power consumption of the semiconductor chip containing the encoding device and draw conclusions from it as to the duration of the encoding operation. However, since the clock signal C1 is fed to the encoding device for longer than the actual encoding operation lasts and in addition the power consumption of the output register is not interrupted, and since the latter continues to be fed clock signals and consequently the data continue to be shifted in circulation, it is not possible for that observer to determine the duration of the actual encoding operation.

The values of the time periods τ1 and τ2 may be stored in a non-volatile memory, which may be likewise contained along with the encoding device in a semiconductor chip, and are loaded into the counter Z in each case at the beginning of an encoding operation. Along with the secret code fed to the encoding unit VE, they represent the secret data of the encoding device and should be inaccessible from the outside through the use of suitable security precautions.

It would also be conceivable to feed a third time period to the counter Z, with the time period τ2 not beginning to run until after the third time period after the beginning of the first time period τ1.

FIG. 2 shows an alternative to the FIG. 1 embodiment of the output register AR in connection with the switch S2. In this case the output register AR is subdivided into a plurality of parts AR1 . . . ARn, to which a change-over switch U1 . . . Un is assigned in each case. In this case, the output datum A of the encoding unit VE is fed to a first input of the first change-over switch U1. An output of this first change-over switch U1 is connected to an input of the first output register part AR1. An output of the first output register part AR1 is connected on one hand to a first input of the second change-over switch U2 and on the other hand to a second input of the first change-over switch U1. The further change-over switches U2 . . . Un and output register parts AR2 . . . ARn are connected in the same way. An output of the output register part ARn forms an output of the overall output register. Each of the change-over switches U1 ... Un is fed the signal $S\tau 2$, lasting for the second time period $\tau 2$. In addition, each of the output registers AR1 ... ARn is fed the clock signal C1. In the case of this variant of an output register, the entire contents of the output register are shifted not through the entire register, but only through individual parts. In an extreme case, these parts may handle just an individual bit, so that the sequence of the encoded output datum in the output register is no longer altered even after the second time period $\tau 2$ elapses.

In the embodiments represented in FIGS. 1 and 2, the output register AR must be constructed as a shift register, but this configuration of output registers is not obligatory for realization of the concept underlying the invention. The basic condition is just that the power consumption of the output register does not alter even after the second time period $\tau 2$ elapses, so that an observer cannot identify from the outside the point from when data are no longer written into the output register.

In an advantageous embodiment of the encoding device according to the invention, the output register AR cannot be read out prematurely.

I claim:

1. An encoding device, comprising:

a first switch;

an encoding unit having at least one data input for input data, at least one data output for output data and a clock input for receiving a clock signal through said first switch;

an output register having a data input, a data output and a clock input for receiving the clock signal;

a second switch connected between said data output of said encoding unit and said data input of said output register; and a device for generating a first time period for driving said first switch and a second time period lying within the first time period for driving said second switch;

said encoding unit clocked by the clock signal for generating the output data from the input data during the first time period; and said second switch transmitting the output data during the second time period from said encoding unit into said output register.

2. The encoding device according to claim 1, wherein said device for generating the first and second time periods includes an adjustable counter having a clock input for receiving the clock signal.

3. The encoding device according to claim 1, wherein said output register is a shift register, said second switch is a change-over switch having first and second inputs and one output, and said data output of said output register is connected to said second input of said change-over switch.

4. The encoding device according to claim 1, wherein:

said output register is a shift register subdivided into a plurality of shift register parts each having an input and an output;

said second switch includes a plurality of change-over switches driven by said device for generating the first and second time periods, said change-over switches including a first change-over switch and other change-over switches;

each of said change-over switches is associated with a respective one of said shift register parts, each of said change-over switches has an output connected to said input of said associated shift register part, a first input, and a second input connected to said output of said associated shift register part, said first input of said first change-over switch is connected to said data output of said encoding unit, and said first inputs of said other change-over switches are each connected to the output of said shift register part disposed upstream of said respective associated shift register part.

5. The encoding device according to claim 1, wherein said encoding unit includes a feedback shift register and a non-linear-extraction unit associated with said feedback shift register.

* * * * *